(12) United States Patent  (10) Patent No.: US 7,811,084 B2
Huang  (45) Date of Patent: Oct. 12, 2010

(54) STEAM SHRINK OVEN

(76) Inventor: Fu-Chuan Huang, No. 111-11, Zhongzhuang Village, Shuishang Shiang, Chiayi County (TW)

( * ) Notice: Subject to any disclaimer, the term of this patent is extended or adjusted under 35 U.S.C. 154(b) by 443 days.

(21) Appl. No.: 12/011,247

(22) Filed: Jan. 25, 2008

(65) Prior Publication Data

US 2009/0188605 A1   Jul. 30, 2009

(51) Int. Cl.
  *B65B 53/02*  (2006.01)
  *B65B 53/06*  (2006.01)
(52) U.S. Cl. .................... 432/144; 432/121; 53/442; 53/557
(58) Field of Classification Search ................ 432/121, 432/128, 133, 136, 143, 144, 145, 152; 53/442, 53/556, 557
See application file for complete search history.

(56) References Cited

U.S. PATENT DOCUMENTS

| 3,716,606 | A | * | 2/1973 | Bazett | 264/489 |
| 3,967,995 | A | * | 7/1976 | Fabianic | 156/86 |
| 4,059,400 | A | * | 11/1977 | Heckman et al. | 432/124 |
| 4,066,866 | A | * | 1/1978 | Fresnel | 219/388 |
| 4,574,565 | A | * | 3/1986 | Gambetti | 53/442 |
| 5,400,570 | A | * | 3/1995 | Bennett | 53/442 |
| 6,497,119 | B1 | * | 12/2002 | Hartel et al. | 65/29.14 |
| 6,648,634 | B2 | * | 11/2003 | Nava | 432/121 |
| 6,689,180 | B1 | * | 2/2004 | Liao | 53/557 |

* cited by examiner

*Primary Examiner*—Gregory A Wilson
(74) *Attorney, Agent, or Firm*—Frenkel & Associates, PC (57) ABSTRACT

The present invention discloses a pre-shrink oven and a shrink oven are located at positions where a conveyer belt travels according to a labeling process of bottles. The pre-shrink oven has adjustable steam ejection ducts at two sides thereof. The shrink oven has steam nozzles at two sides. The steam generators are located at the periphery of the shrink oven to generate and deliver steam of different pressures through pipes to the adjustable steam ejection ducts of the pre-shrink oven and the steam nozzles of the shrink oven. When the steam is delivered to the pre-shrink oven heated air passes through apertures of the steam tube to partially preheat and shrink a shrink film without dropping before a final shrinking process is finished. Steam delivered through the steam nozzles can shrink the shrink film securely on bottle bodies of the bottles.

10 Claims, 9 Drawing Sheets

STEAM SHRINK OVEN

FIELD OF THE INVENTION

The present invention relates to a steam shrink oven and particularly to an apparatus to shrink and position labels of a labeling machine through heated air.

BACKGROUND OF THE INVENTION

Figure 1:
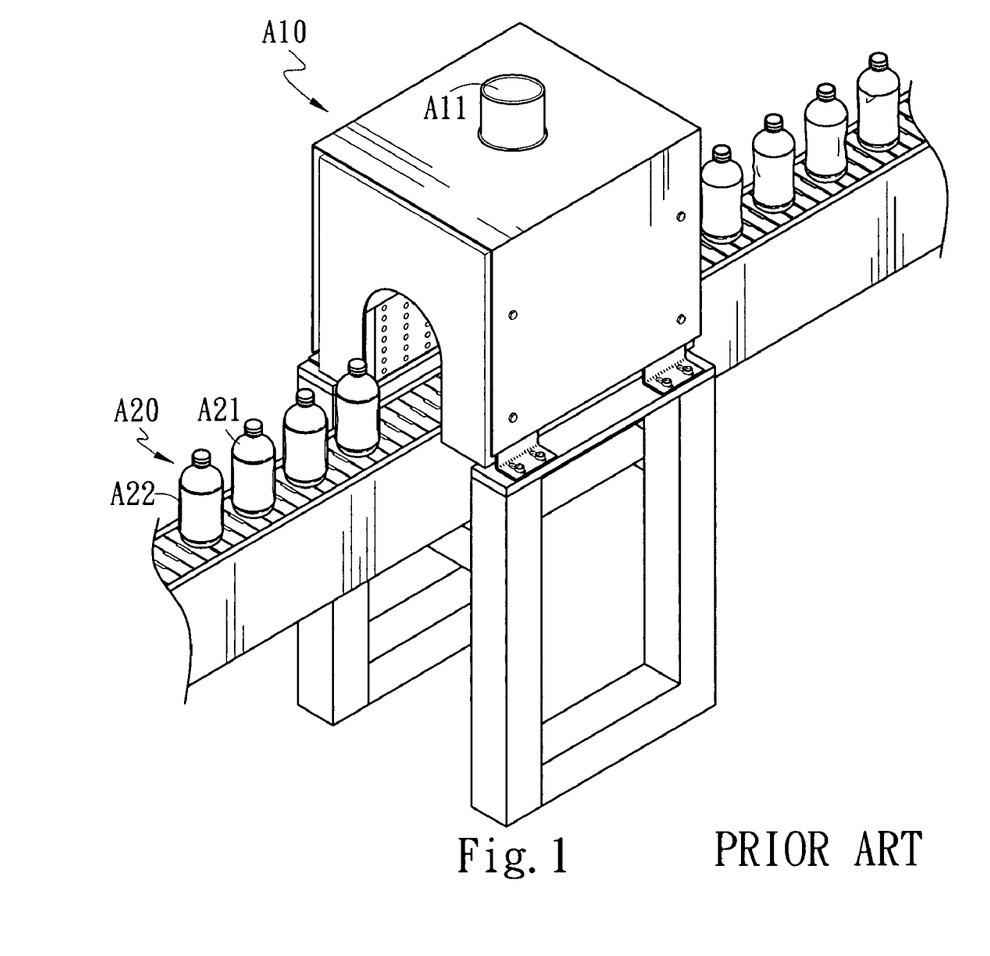
FIG. 1 is a perspective view of a conventional shrink oven.

Referring to FIG. 1, a conventional electric heating shrink oven has a pre-shrink oven A10 which has an electric heater A11 located at an upper end. When bottles A20 carried by a conveyer belt pass through the pre-shrink oven A10 heated air generated by the electric heater A11 is discharged through air outlets at two inner sides of the pre-shrink oven A10 to position a label A22 previously coupled on a bottle body A21 of each bottle. Such a process has problems in practice, notably:

1. There is a distance between the air outlets of the electric heater A11 at the two inner sides of the pre-shrink oven A10 and the bottles A20. The distance is not adjustable in response to various sizes of the bottles A20 to allow the heated air generated by the electric heater A11 to shrink the label A22 coupled on the bottle body A21.

Figure 2:
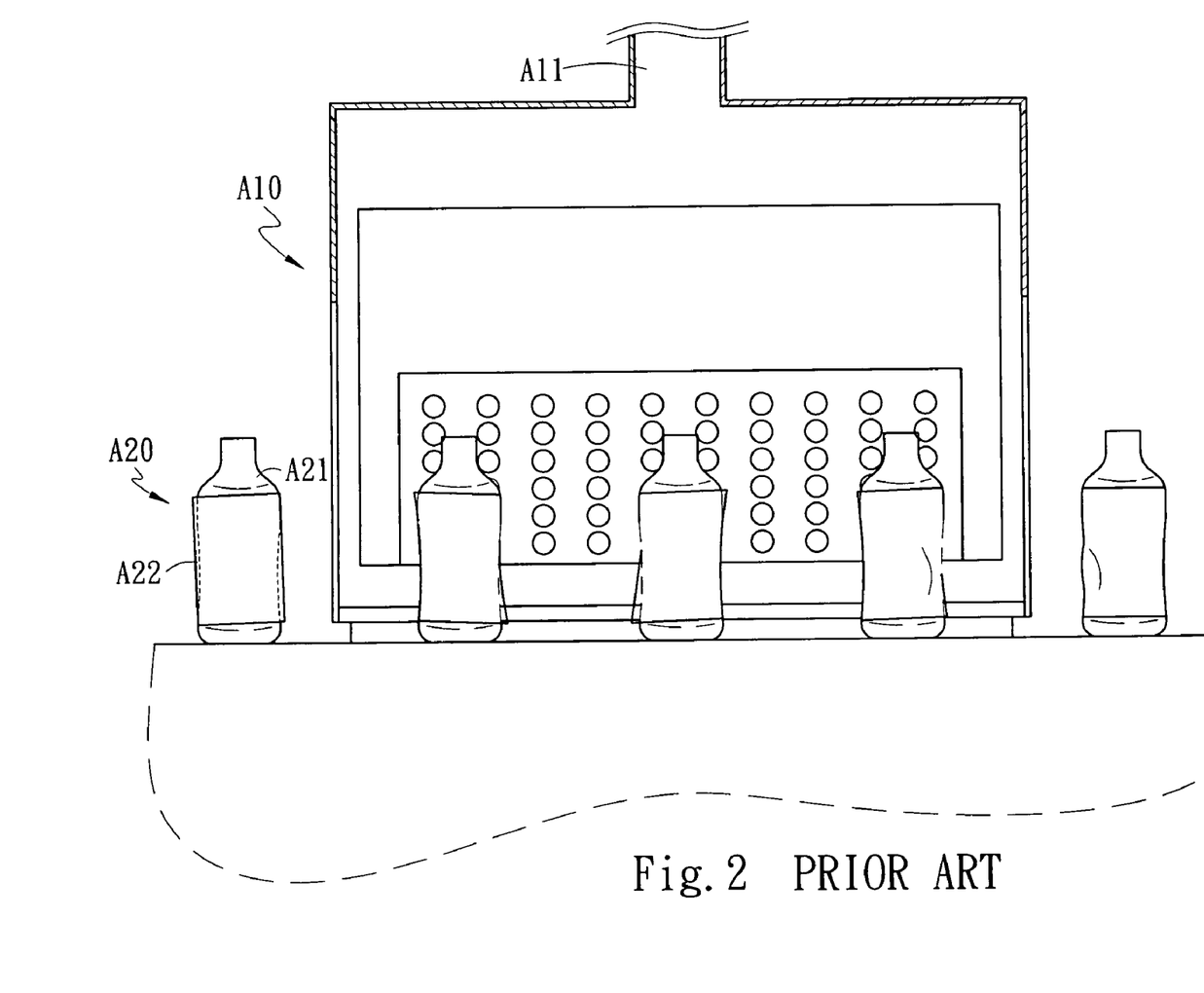
FIG. 2 is schematic side view of a conventional shrink oven.

2. As there is a distance between the air outlets of the electric heater A11 at the two inner sides of the pre-shrink oven A10 and the bottles A20 carried by the conveyer belt, the label A22 cannot be evenly heated and pre-shrunk and positioned on the bottle body A21. Positioning operation of the bottles A20 in the follow-on shrinking process cannot be effectively performed as desired, referring to FIG. 2.

SUMMARY OF THE INVENTION

The primary object of the present invention is to provide a steam shrink oven to improve processing efficiency of a labeling machine and save energy, and adjust the distance between bottle bodies and a pre-shrink oven and a shrink oven according bottle types to achieve required shrinking and positioning effect.

To achieve the foregoing object, the steam shrink oven according to the invention mainly includes a conveyer belt, a pre-shrink oven, a shrink oven, a plurality of steam generators and pipes. The pre-shrink oven and the shrink oven are located at desired positions where the conveyer belt travels according to a labeling process of bottles. The pre-shrink oven has adjustable steam ejection ducts at two sides thereof each consists of a steam tube, a screw bar and an adjustment knob. Each steam tube has a plurality of apertures. The screw bar has two sides coupling respectively with the adjustment knob and the steam tube. The shrink oven has steam nozzles at two sides. Each steam nozzle has a rotary knob to adjust the position thereof. A synchronous bar is provided between the rotary knobs at two sides to adjust the position of the steam nozzle simultaneously. The steam generators are located at the periphery of the shrink oven to deliver steam of different pressure through the pipes to the adjustable steam ejection ducts of the pre-shrink oven and the steam nozzles of the shrink oven. Hence when the steam is delivered to the pre-shrink oven, heated air is discharged through the apertures to partially preheat and shrink a shrink film without dropping before the final shrink process is finished. Then the steam discharged through the steam nozzles can shrink and position the shrink film on the bottle body. The shrink oven has an openable protective lid with a viewing window formed thereon.

The steam shrink oven thus constructed can achieve the following effects:

1. The shrink film can be positioned directly and rapidly: As the invention provides the pre-shrink oven which releases the heated air to partially pre-shrink, the shrink film without dropping before the final shrinking process is finished, and the steam discharged through the steam nozzles can shrink and position the shrink film on the bottle body, shrinking and positioning of the shrink film can be performed quickly, and production efficiency improves.

2. Reduce cost: As the steam shrink oven of the invention adopts a two-stage shrinking process, the process speed can be increased many times. Production quantity of each unit of time also increases, thus the cost is lower.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 3:
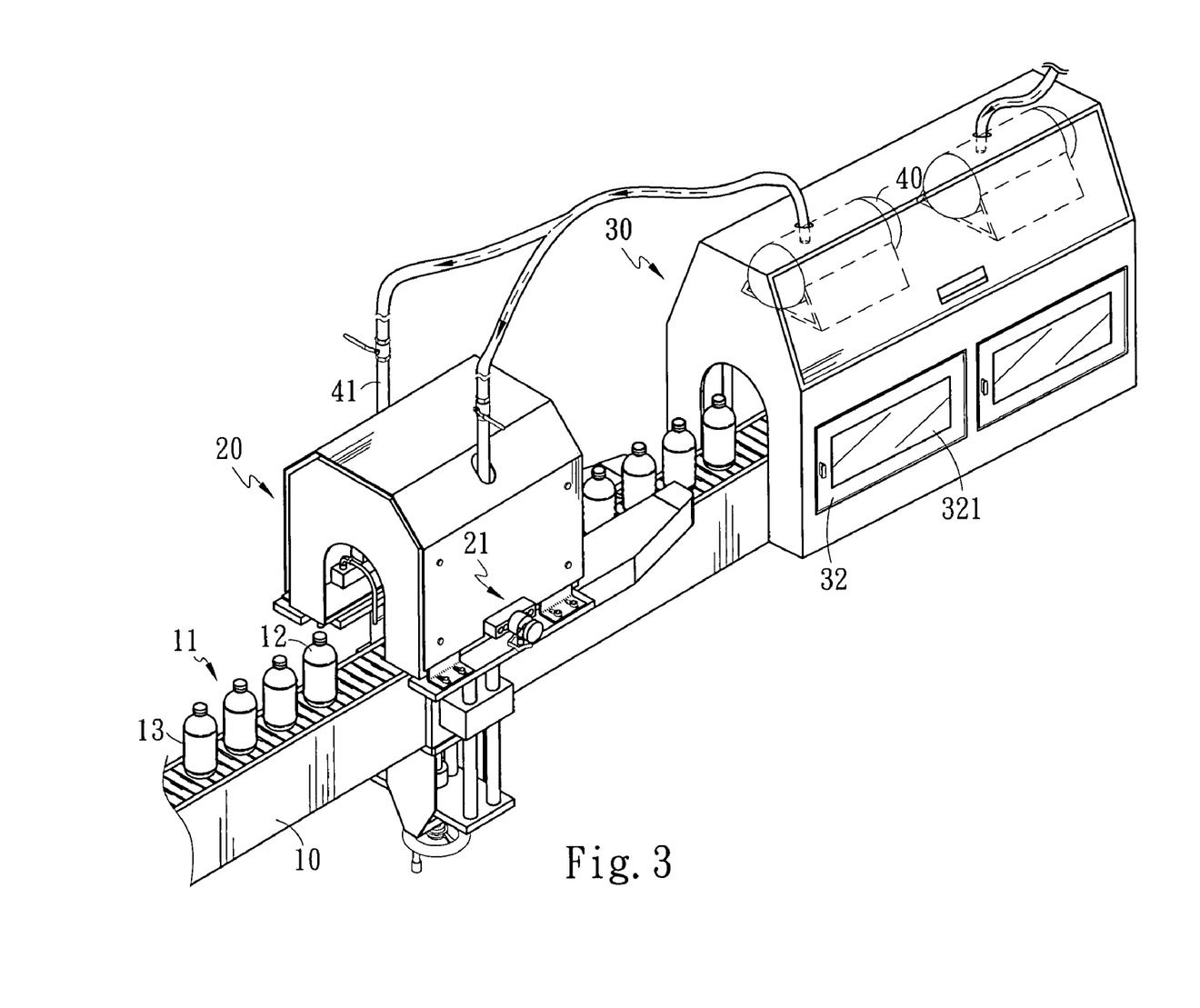
FIG. 3 is a perspective view of the invention in an assembled condition.

Please referring to FIG. 3, the steam shrink oven of the invention mainly includes a conveyer belt 10 to carry bottles 11, a pre-shrink oven 20, a shrink oven 30 and a plurality of steam generators 40. The pre-shrink oven 20 and the shrink oven 30 are located at desired positions where the conveyer belt 10 travels according to a labeling process of the bottles 11. The pre-shrink oven 20 has adjustable steam ejection ducts 21 at two sides thereof. The distance between the position of the adjustable steam ejection ducts 21 and bottle bodies 12 of the bottles 11 carried by the conveyer belt 10 can be adjusted as desired. The bottle bodies 12 also can be pre-positioned to allow labels 13 on the bottles 11 to be evenly shrunk in the shrink oven 30 through heat energy of steam. The steam generators 40 are located on the periphery of the shrink oven 30 to distribute the steam of different pressures through pipes 41 to the pre-shrink oven 20 and the shrink oven 30. The shrink oven 30 further has a protective lid 32 at one side with a viewing window 321 formed thereon so that operating conditions in the shrink oven 30 can be seen from outside to make sure that they conform to requirements. The viewing window 321 can be formed is any geometric shape required. The bottles 11 can be containers such as plastic bottles, glass bottles or the like that are to be coupled with labels.

Figure 4A:
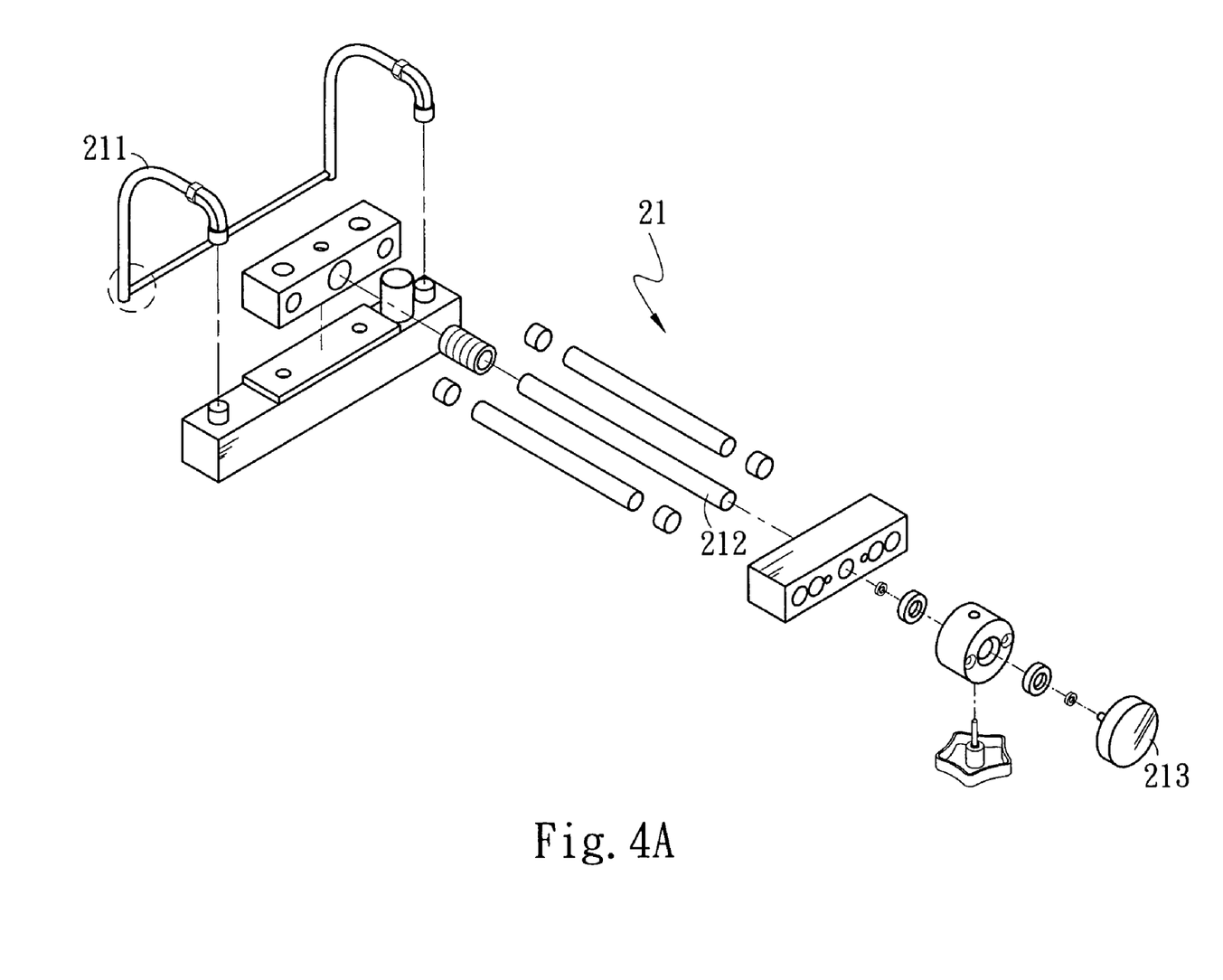
FIG. 4A is an exploded view of an adjustable steam ejection duct of the invention.
Figure 4B:
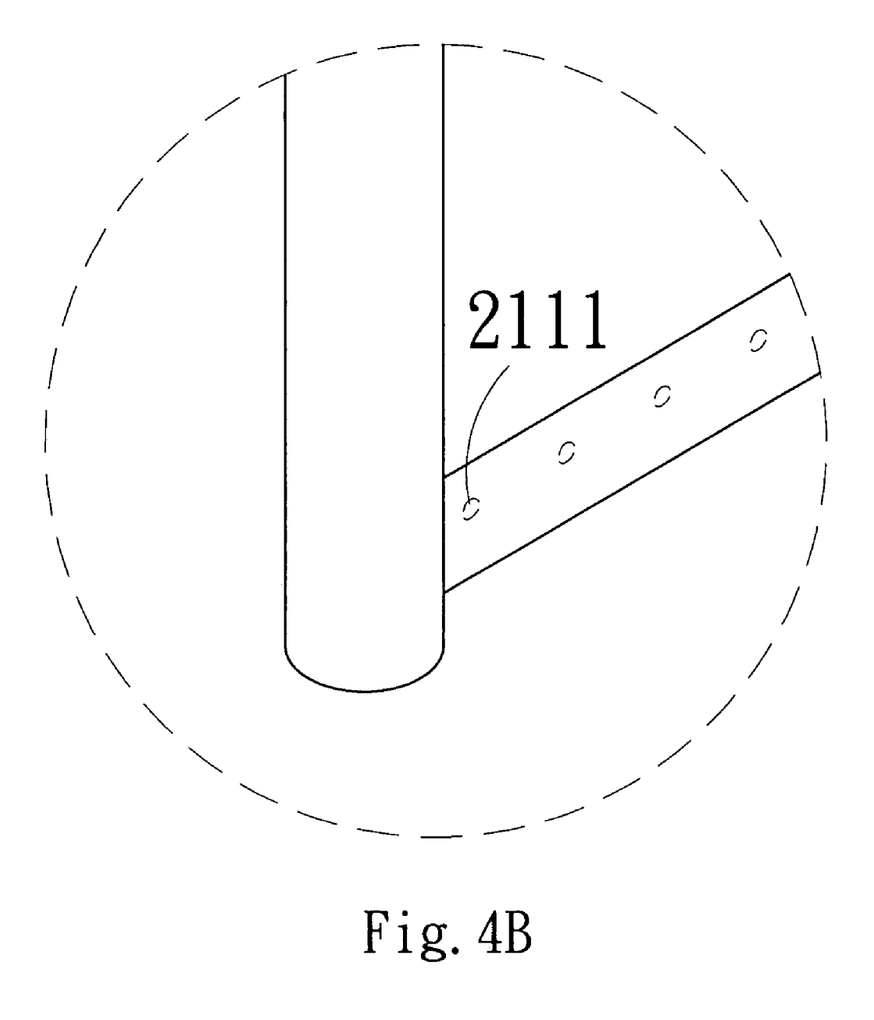
FIG. 4B is a partial magnified view of an adjustable steam ejection duct of the invention.

Referring to FIGS. 3 through 4B, each of the adjustable steam ejection ducts 21 at two sides of the pre-shrink oven 20 consists of a steam tube 211, a screw bar 212 and an adjustable knob 213. The steam tube 211 has a plurality of apertures 2111 to discharge steam and heated air to partially pre-shrink and position the label 13. The screw bar 212 has two sides coupling respectively with the adjustment knob 213 and the steam tube 211. The apertures 2111 may be other articles of the same effect or function, such as nozzles. The steam tube 211 may also be a blow pipe.

Figure 6:
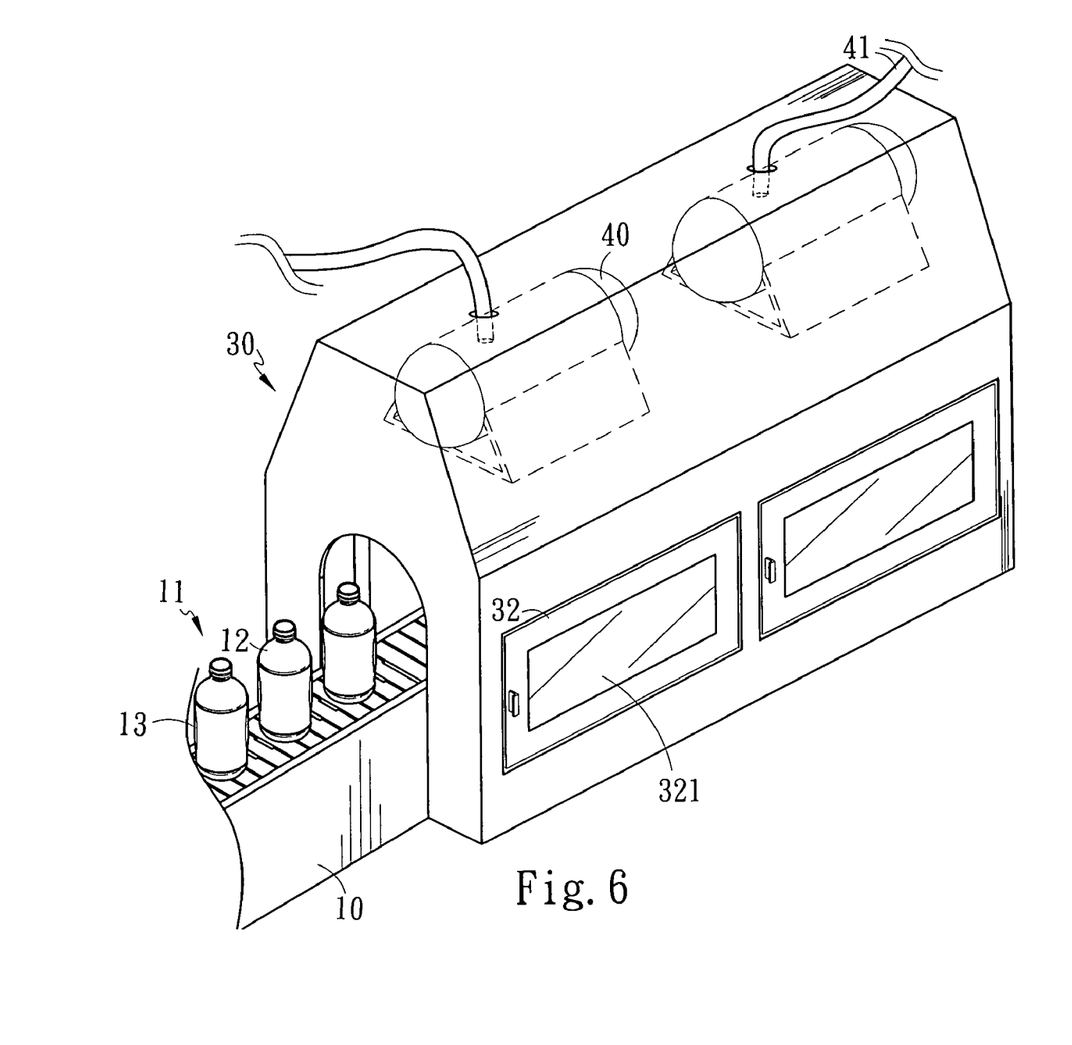
FIG. 6 is a perspective view of the shrink oven of the invention.
Figure 7:
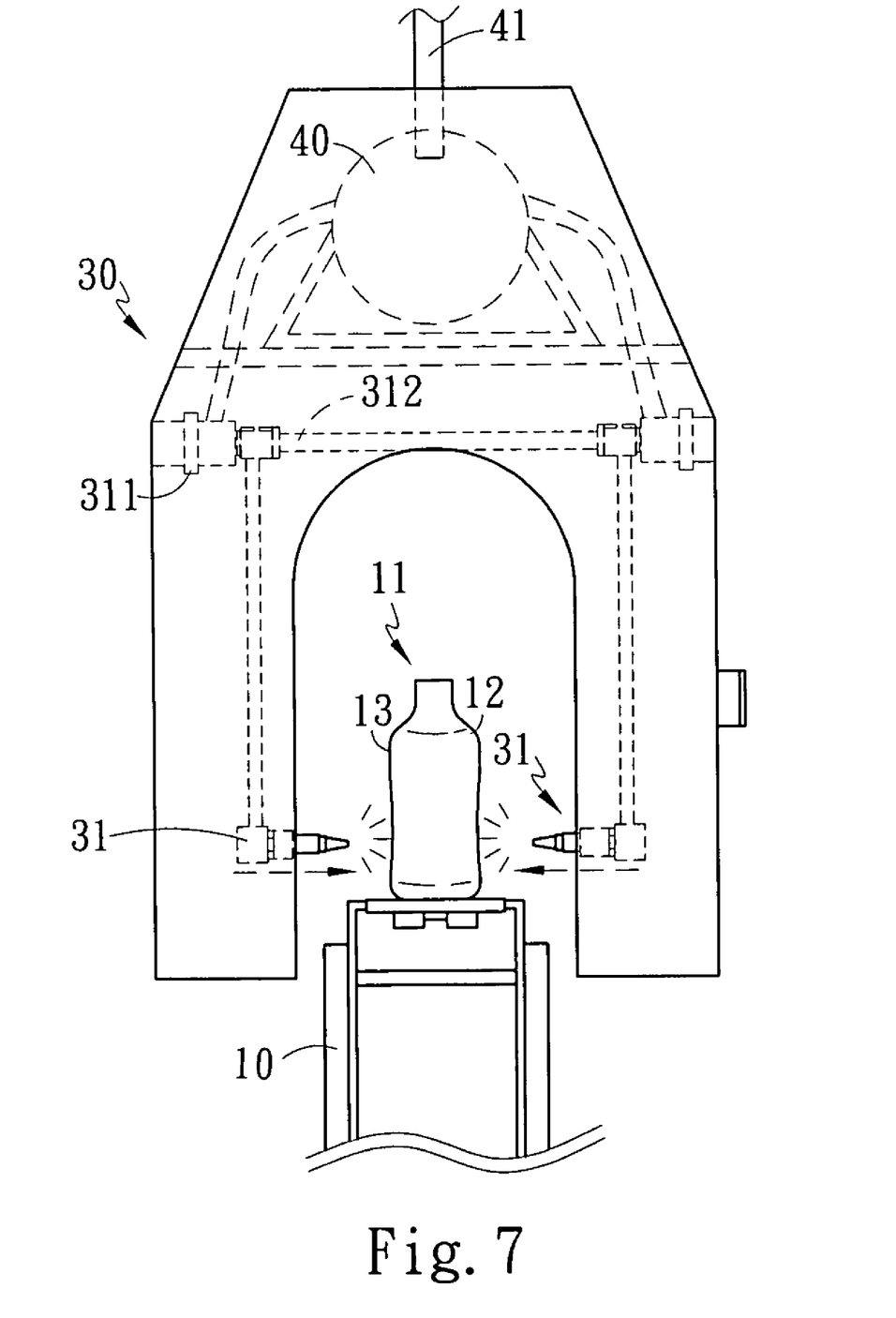
FIG. 7 is schematic view of the shrink oven of the invention in an operating condition.
Figure 8:
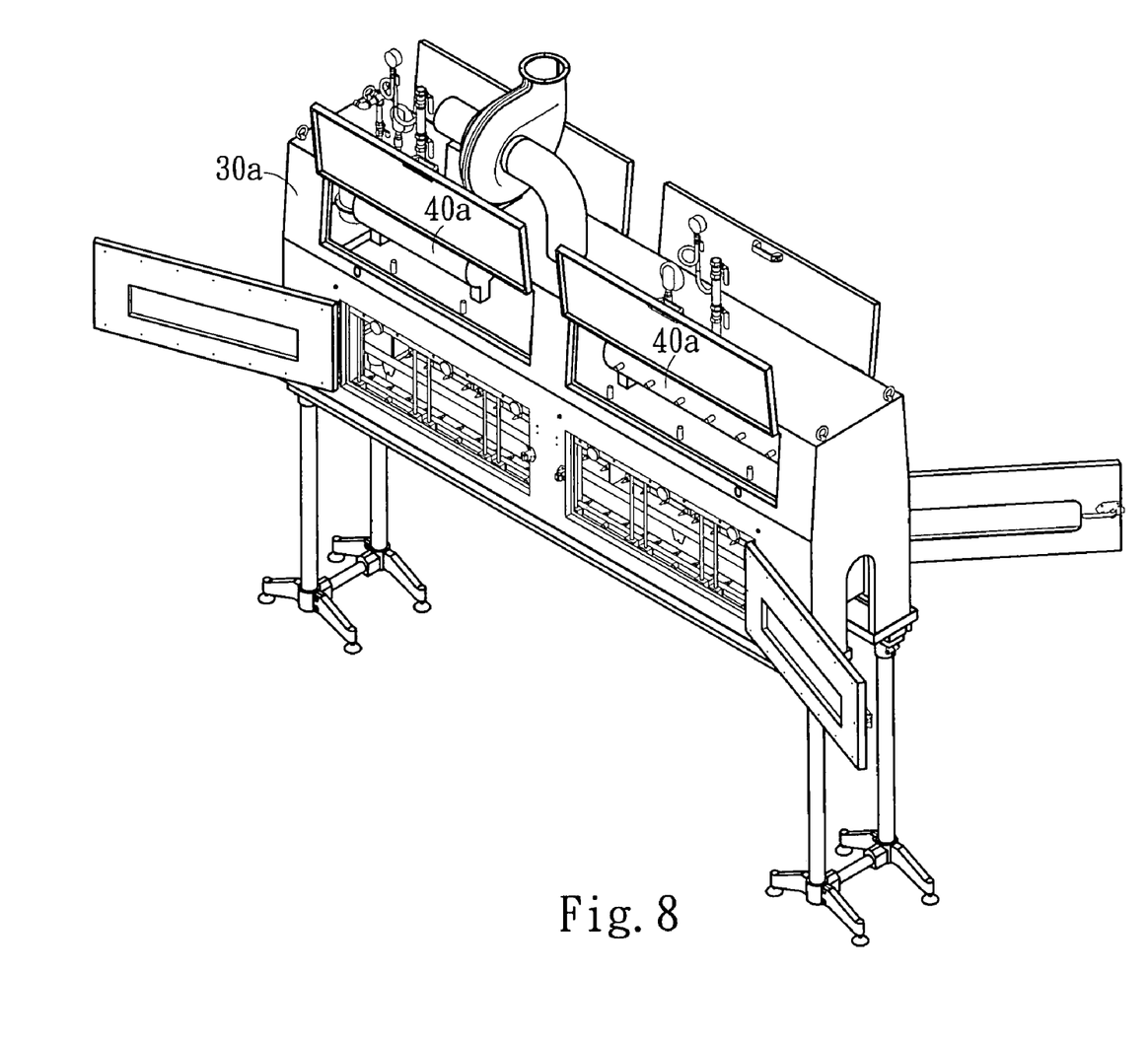
FIG. 8 is a perspective view of another embodiment of the shrink oven of the invention.

Referring to FIGS. 6 and 7, the shrink oven 30 has steam nozzles 31 at two sides to evenly shrink the labels 13 on the bottles 11. The steam nozzles 31 are connected to the pipes 41 to receive the steam from the steam generators 40. After the bottles 11 are carried by the conveyer belt 10 into the shrink oven 30, a great amount of steam is evenly ejected through the steam nozzles 31 to the labels 13 on the bottle bodies 12 of the bottles 11 so that the labels 13 are evenly shrunk and formed. The protective lid 32 at one side of the shrink oven 30 can be opened. The viewing window 321 on the protective lid 32 allows the operating conditions in the shrink oven 30 to be seen from outside to make sure that they conform to requirements. Each of the steam nozzles 31 has a rotary knob 311 to adjust the position thereof. The rotary knobs 311 at two sides are linked by a synchronous bar 312 to adjust the positions of the steam nozzles 31 at two sides simultaneously to allow the labels 13 to be shrunk as desired. The number of the steam generators 40a above the shrink oven 30a can be increased proportionally according to use requirements or the size of the shrink oven 30a, referring to FIG. 8.

Figure 5:
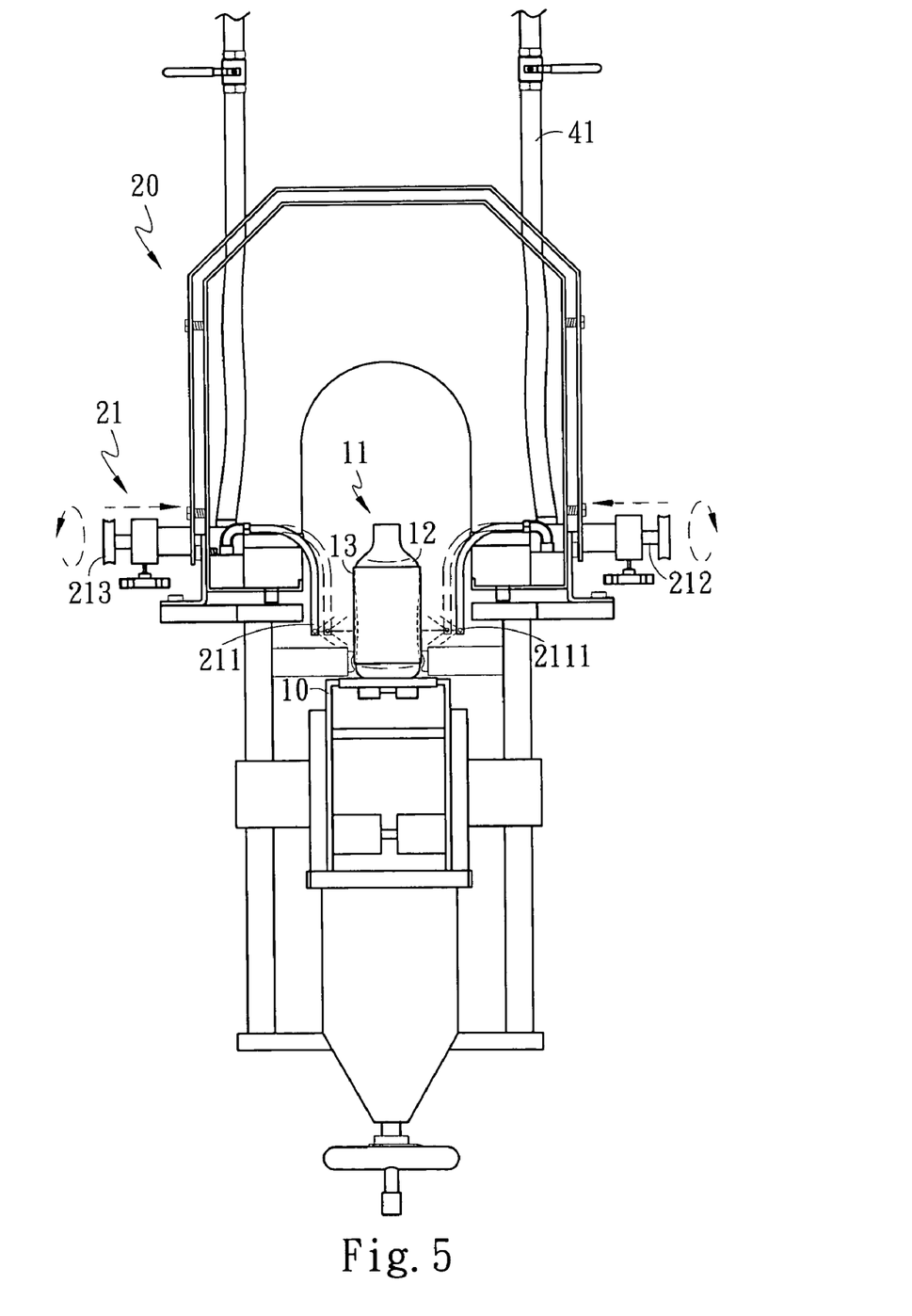
FIG. 5 is a schematic view of the pre-shrink oven of the invention in an operating condition.

Referring to FIG. 5, when the bottles 11 coupled with the labels 13 are carried by the conveyer belt 10 into the pre-shrink oven 20, steam flows through the pipes 41 to the adjustable steam ejection ducts 21, steam tube 211 and apertures 2111 to be evenly dispensed to the labels 13 on the bottle bodies 12 of the bottles 11 to pre-shrink and position the labels 13. By turning the adjustment knob 213, the steam tube 211 can be moved in response to the shrinking condition of the labels 13 to accomplish pre-shrinking and positioning purpose. In the event that the type of the bottles 11 is changed, the adjustment knob 213 can be turned to adjust the adjustable steam ejection ducts 21 to evenly shrink and pre-position the labels 13. Thus the pre-shrink oven 20 is adaptable to pre-shrinking and positioning operation of the labels 13 of various types of bottles 11. The bottles 11 can be made from varying types of materials.

What is claimed is:

1. A steam shrink oven comprising mainly a conveyer belt to carry bottles, a pre-shrink oven, a shrink oven, a plurality of steam generators and a plurality of pipes, the pre-shrink oven and the shrink oven being located at positions where the conveyer belt travels according to a labeling process of the bottles, wherein:

the pre-shrink oven has adjustable steam ejection ducts at two sides thereof each consists of a steam tube, a screw bar and an adjustment knob, the steam tube having a plurality of apertures, the screw bar having two sides coupling respectively with the adjustment knob and the steam tube;

the shrink oven has steam nozzles at two sides each having a rotary knob to adjust the position thereof and a synchronous bar linking the steam nozzles at the two sides to simultaneously adjust the positions thereof; and the steam generators are located above the shrink oven to generate steam of different pressures that is delivered through the pipes to the adjustable steam ejection ducts of the pre-shrink oven and the steam nozzles of the shrink oven so that when the steam is sent to the pre-shrink oven heated air passes through the apertures to partially preheat and shrink a shrink film without dropping before a final shrinking process is finished, and the steam is ejected through the steam nozzles to shrink the shrink film on bottle bodies of the bottles; the shrink oven further having a protective lid at one side that has a viewing window formed thereon.

2. The steam shrink oven of claim 1, wherein the pre-shrink oven is adaptable to pre-shrink and position labels of various types of bottles.

3. The steam shrink oven of claim 1, wherein the number of the steam generators increases proportionally according to use requirements or the size of the shrink oven.

4. The steam shrink oven of claim 1, wherein the viewing window is formed in a desired geometric shape.

5. The steam shrink oven of claim 1, wherein the bottles are made from plastics.

6. The steam shrink oven of claim 1, wherein the bottles are made from glass.

7. The steam shrink oven of claim 1, wherein the bottles are containers each being coupled with a label.

8. The steam shrink oven of claim 1, wherein the apertures are nozzles.

9. The steam shrink oven of claim 1, wherein the apertures are articles of the same effect or function.

10. The steam shrink oven of claim 1, wherein the steam tube is a blow pipe.

* * * * *